(12) United States Patent
Lee

(10) Patent No.: US 7,123,745 B1
(45) Date of Patent: Oct. 17, 2006

(54) METHOD AND APPARATUS FOR DETECTING MOVING OBJECTS IN VIDEO CONFERENCING AND OTHER APPLICATIONS

(75) Inventor: Mi-Suen Lee, Ossining, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/449,250

(22) Filed: Nov. 24, 1999

(51) Int. Cl.
G06K 9/00 (2006.01)

(52) U.S. Cl. .............. 382/103; 382/107; 382/173; 382/199; 348/154; 348/155; 348/169

(58) Field of Classification Search ........... 382/103, 382/107, 173, 193, 236; 348/14.15, 154, 348/155, 169, 701
See application file for complete search history.

(56) References Cited

U.S. PATENT DOCUMENTS

| | | | |
|---|---|---|---|
| 4,912,770 A | | 3/1990 | Seto et al. |
| 5,134,472 A | * | 7/1992 | Abe ............... 348/700 |
| 5,734,737 A | * | 3/1998 | Chang et al. ......... 375/240.16 |
| 5,969,755 A | | 10/1999 | Courtney ............ 348/143 |
| 6,035,067 A | * | 3/2000 | Ponticos ............ 382/226 |
| 6,104,831 A | * | 8/2000 | Ruland ............. 382/173 |
| 6,360,002 B1 | * | 3/2002 | Kim et al. ........... 348/169 |

FOREIGN PATENT DOCUMENTS

| | | |
|---|---|---|
| DE | 19633581 | 2/1998 |
| EP | 0635983 A2 | 1/1995 |
| EP | 0790741 A2 | 8/1997 |
| WO | 9203801 | 3/1992 |
| WO | 9704600 | 2/1997 |

OTHER PUBLICATIONS

Grouping.,—, into Regions, Curves, and Junctions Mi-Suen Lee and Gerard Medioni, Journal of Computer Vision and Image Understanding, Col. 99, Academic Press.

* cited by examiner

Primary Examiner—Jingge Wu
Assistant Examiner—Charles Kim

(57) ABSTRACT

An image processing system detects a moving person or other object of interest. The system generates a thresholded difference image by processing a video signal or other type of image signal received from a camera. The difference image is then segmented into regions bounded by vertical lines passing through the image, and silhouette candidates are identified in one or more of the regions. Tensor voting is used to determine saliency values and corresponding tangents for each of the silhouette candidates, and the resulting values and tangents are used to detect the object of interest. In an embodiment in which the object of interest is a moving person, a neck position of the moving person may be detected by analyzing a sum of x-components of tangents along a corresponding silhouette. The detected neck position may then be utilized to determine a head position and a head size for the moving person.

20 Claims, 5 Drawing Sheets

FIG. 3A  FRAME t-1
FIG. 3B  FRAME t
FIG. 4  DIFFERENCE IMAGE

METHOD AND APPARATUS FOR DETECTING MOVING OBJECTS IN VIDEO CONFERENCING AND OTHER APPLICATIONS

FIELD OF THE INVENTION

The present invention relates generally to the field of image signal processing, and more particularly to techniques for detecting moving persons or other objects of interest in a video signal or other type of image signal.

BACKGROUND OF THE INVENTION

Detection and tracking of a person or other object of interest is an important aspect of video-camera-based systems such as video conferencing systems, video surveillance and monitoring systems, and human-machine interfaces. For example, in a video conferencing system, it is often desirable to frame the head and shoulders of a particular conference participant in the resultant output video signal, while in a video surveillance system, it may be desirable to frame the entire body of, e.g., a person entering or leaving a restricted area monitored by the system.

Conventional techniques for detecting persons in the above-noted applications include background subtraction, face detection and skin tone detection. A significant problem with these and other conventional detection techniques is that many of them use general models or scene assumptions that make the techniques difficult to adapt for use with typical home or office scenes. For example, since moving persons in such home or office scenes often interact with objects such as chairs, sofas, and items on tables, a background subtraction technique would need to either keep track of a large number of foreground objects or update the background model frequently. In addition, face detection and skin tone detection techniques usually only handle only a limited number of head poses, e.g., faces close to the camera. Another problem with these techniques is that the models used may be unable to accurately account for varying lighting conditions. Moreover, given the degree of clutter in typical home or office scenes, these and other conventional techniques that make use of edge detection are generally not suitable for real-time implementation.

Other detection techniques make use of motion as a visual cue for scene analysis. Motion-based detection is particularly useful for cluttered scenes in which frequent movements of people and objects are common, such as the above-noted typical home or office environments. One known motion-based detection technique uses optical flow fields to group together as an object connected pixels undergoing similar motion. Image differencing techniques utilize the differences between consecutive frames to locate moving objects in a scene.

Such techniques are generally well suited for use in applications in which the number of moving objects in the scene is small and the interactions between them are limited. Although image differencing techniques can in some cases be adaptive to dynamic environments, such techniques nonetheless generally do a poor job of extracting all relevant feature pixels. Another significant problem with image differencing and other conventional motion-based detection techniques is that it can be hard to separate multiple moving objects occupying the same image region.

An example of a conventional motion-based detection technique is described in European Patent Application No. 635983 A2, entitled "Method and Means for Detecting People in Image Sequences." This technique starts with analyzing a difference image, obtained by subtracting a current frame from a previous frame, and tries to locate the head positions of people in the image. However, this technique relies on the computation of continuous curve and curvature extrema, and is therefore sensitive to noise and is computationally expensive.

As is apparent from the above, a need exists for improved techniques for detecting persons in image processing systems such as video conferencing systems, video surveillance and monitoring systems, and human-machine interfaces.

SUMMARY OF THE INVENTION

The invention provides methods and apparatus for detection of persons or other objects of interest in a video signal or other type of image signal.

In accordance with an illustrative embodiment of the invention, a processing system generates, e.g., a thresholded difference image by processing an image signal received from a camera. The difference image is then segmented into regions bounded by vertical lines passing through the image, and silhouette candidates are identified in one or more of the regions. Tensor voting is used to determine saliency values and corresponding tangents for each of the silhouette candidates, and the resulting values and tangents are used to detect the object of interest. If the object of interest is a moving person, a neck position of the moving person may be detected by analyzing a sum of x-components of tangents along a corresponding silhouette. The detected neck position may then be utilized to determine a head position and a head size for the moving person. The present invention thus provides a real-time processing system that is particularly well suited for detecting moving persons or other objects of interest in a typical home or office scene, or other cluttered environment.

The detection techniques of the present invention provide a number of significant advantages over conventional techniques. For example, detection techniques in accordance with the invention are generally more robust to noise and less computationally expensive than conventional techniques. In addition, the techniques of the invention can detect moving persons and other objects of interest in real time, and can handle the presence of multiple persons, and varying body sizes and poses. The number of moving objects, together with positions and silhouettes of the objects, can be computed automatically without any initialization. Moreover, the invention significantly improves the efficiency and accuracy of the detection of particular features, such as the neck and head of a moving person. The techniques of the invention can be used in a wide variety of image processing applications, including video-camera-based systems such as video conferencing systems, video surveillance and monitoring systems, and human-machine interfaces. These and other features and advantages of the present invention will become more apparent from the accompanying drawings and the following detailed description.

BRIEF DESCRIPTION OF THE DRAWINGS

FIGS. 3A and 3B show an example of two consecutive frames of a typical cluttered office scene that is used to illustrate the detection techniques of the present invention.

FIG. 4 shows a thresholded difference image generated from the frames of FIGS. 3A and 3B.

DETAILED DESCRIPTION OF THE INVENTION

Figure 1:
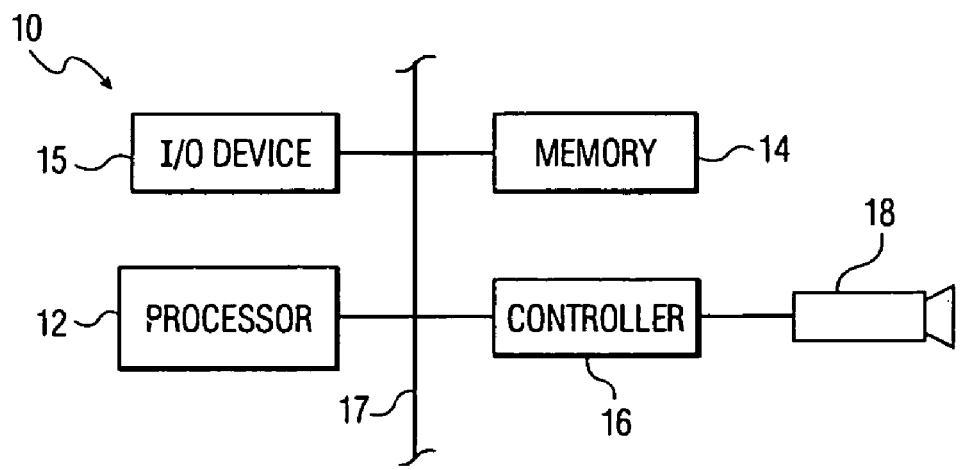
FIG. 1 is a block diagram of an image processing system in which the present invention may be implemented.

FIG. 1 shows an image processing system 10 in which moving object detection techniques in accordance with the invention may be implemented. The system 10 includes a processor 12, a memory 14, an input/output (I/O) device 15 and a controller 16, all connected to communicate over a system bus 17. The system 10 further includes a camera 18 that is coupled to the controller 16 as shown. The camera 18 may be, e.g., a pan-tilt-zoom (PTZ) camera, a zoom camera or any other suitable image capture device. The term "camera" as used herein is therefore intended to include any type of image capture device.

The system 10 may be adapted for use in any of a number of different image processing applications, including, e.g., video conferencing, video surveillance, human-machine interfaces, etc. More generally, the system 10 can be used in any application which can benefit from the improved detection capabilities provided by the present invention.

Elements or groups of elements of the system 10 may represent corresponding elements of an otherwise conventional desktop or portable computer, as well as portions or combinations of these and other processing devices. Moreover, in other embodiments of the invention, some or all of the functions of the processor 12, controller 16 or other elements of the system 10 may be combined into a single device. For example, one or more of the elements of system 10 may be implemented as an application specific integrated circuit (ASIC) or circuit card to be incorporated into a computer, television, set-top box or other processing device.

The term "processor" as used herein is intended to include a microprocessor, central processing unit, microcontroller or any other data processing element that may be utilized in a given data processing device. In addition, it should be noted that the memory 14 may represent an electronic memory, an optical or magnetic disk-based memory, a tape-based memory, as well as combinations or portions of these and other types of storage devices.

The present invention in an illustrative embodiment provides a motion-based detection technique that makes use of temporal differencing and perceptual organization principles to detect moving persons or other objects of interest in cluttered indoor scenes such as home and office environments.

In general, the illustrative embodiment of the invention extracts motion silhouettes from a temporal difference image that has been binarized by thresholding. It first analyzes the distribution of non-zero pixels to segment the scene into regions. For each region, the non-zero pixels closest to a region bounding box form the first approximation of the motion silhouette. To deal with noise and outliers, the saliency of the silhouette points are then evaluated by examining the configuration of the silhouette using tensor voting. Once the salient points on the silhouettes are identified, missing data, together with the complete silhouette, can be inferred by applying tensor voting again. Alternatively, the inferred geometric properties of the salient silhouette points can be used to locate the head position, e.g., so as to verify that the moving object is human.

Figure 2:
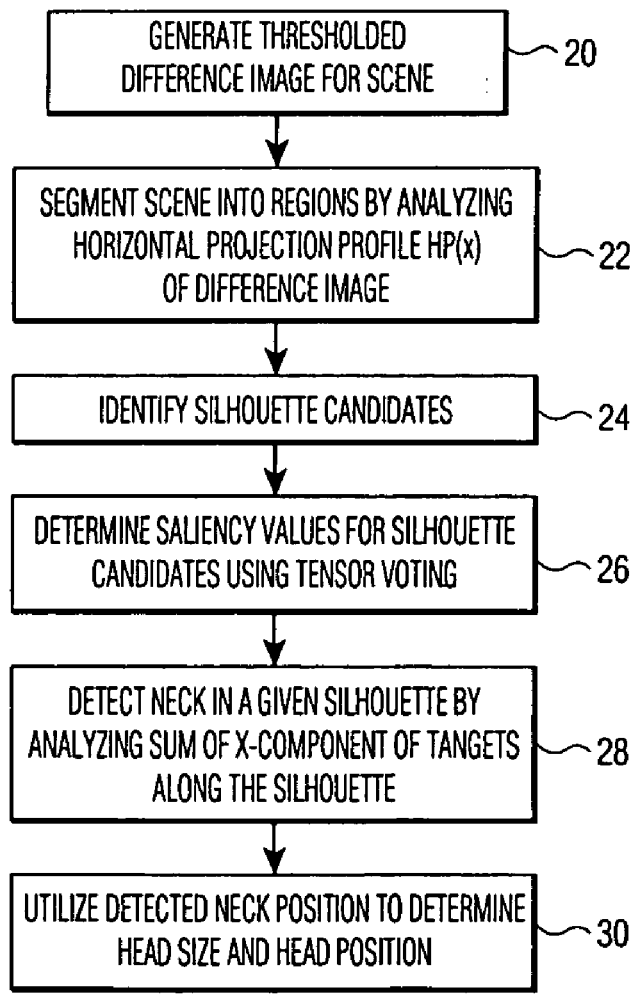
FIG. 2 is a flow diagram showing the operation of an exemplary moving object detection technique in accordance with an illustrative embodiment of the invention.

FIG. 2 is a flow diagram showing the motion-based detection technique of the illustrative embodiment. For this embodiment, it is assumed that the objects of interest include one or more persons in a scene corresponding to a cluttered environment such as an indoor home or office scene. FIGS. 3A and 3B show consecutive frames t−1 and t, respectively, for an example of a cluttered office scene of this type, with two moving persons to be detected. Relevant information to be detected in this example includes the head position and head size of each of the persons. In the following description, an overview of the detection technique will be provided with reference to FIG. 2, and then each of the steps of the technique will be described in greater detail.

In step 20 of FIG. 2, a thresholded difference image is generated for the scene to be analyzed. As previously noted, such a difference image can be generated in a conventional manner by taking the difference between two frames or other images of the scene of interest, and then applying an appropriate thresholding technique. FIG. 4 shows an example of a thresholded difference image generated for the cluttered office scene using the two consecutive frames of FIGS. 3A and 3B.

Figure 5:
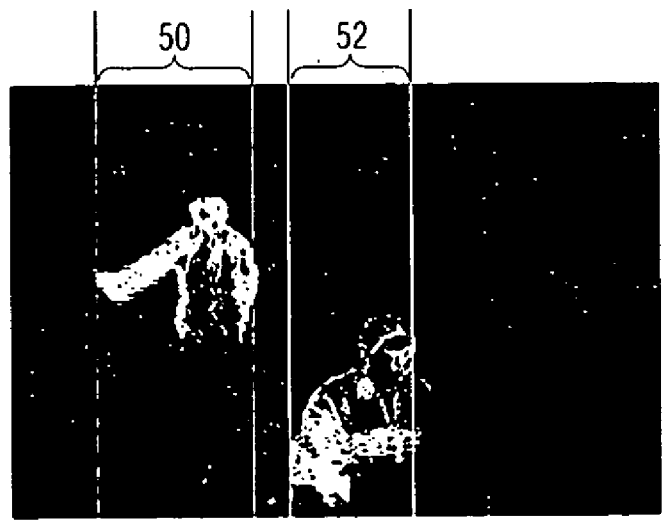
FIG. 5 illustrates the segmentation of the FIG. 4 difference image into regions.

In step 22, the scene of interest is segmented into regions by analyzing a horizontal projection profile HP(x) to be described in greater detail below. FIG. 5 illustrates the segmentation process as applied to the difference image of FIG. 4. It can be seen that the segmentation process in this example divides the difference image into a total of five regions separated by four vertical lines. These regions include regions 50 and 52, each of which corresponds to one of the persons to be detected.

In step 24, silhouette candidates in the segmented image are identified. Saliency values for the silhouette candidates are then determined in step 26 using a tensor voting technique to be described in greater detail below. In step 28, the neck of a person corresponding to a given silhouette is detected by analyzing the sum of the x-component of tangents along the silhouette. The detected neck position is then used in step 30 to determine the head size and head position of the moving person.

The motivations behind the detection technique of FIG. 2 will now be described in greater detail, followed by specific description of particular steps in the process.

In accordance with the well-known constant brightness constraint, when movements in a given scene are small, frame differencing produces effects similar to a typical response to an edge detector. This follows from the constant brightness constraint equation:

$$I_t(x, y) = -(x_t I_x + y_t I_y)$$

where, given an image sequence I(x,y,t), $$I_t = \frac{dI}{dt},$$

$$x_t \frac{dx}{dt},$$

$$y_t = \frac{dy}{dt},$$

$$I_x = \frac{dI}{dx},$$

and $$I_y = \frac{dI}{dy}.$$

In other words, no or low changes in intensity value can be caused by no motion or low contrast in the local neighborhood, or both. However, for segmentation purposes, it is desirable to determine a true change map C(x,y):

$$C(x, y) = \begin{cases} |[x_t \ y_t]| > 0 & 1 \\ \text{otherwise} & 0 \end{cases}$$

from which moving objects can easily be extracted when the camera is stationary.

Notice that despite the limited amount of information in the difference image of FIG. 4, humans can still segment the underlying objects and "fill in" the interior of the objects where no information is given, i.e., the human vision system can essentially compute the change map C(x,y) from a difference image $I_t$(x,y). As will be described below, the present invention exploits perceptual organization principles that may have been used in the derivation of C(x,y) in human vision system, to obtain an abstraction of C(x,y) from the difference image $I_t$(x,y).

The first grouping principle exploited by the present invention is the attentive nature of the perception of human shape. An attentive process is one that needs to use previously acquired knowledge in order to perceive an object in an image, which usually takes longer than a pre-attentive process. For example, when a difference image such as that of FIG. 4 is turned upside down, the perception of human bodies in the scene is weaker, especially for the person in the back. We usually interact with people in an upright position, and therefore are less familiar with the shape of body parts of a person in an upside-down position.

In order to use this prior knowledge, the detection technique of the illustrative embodiment assumes people appear in an upright position in the image sequence. Consequently, just head and shoulder silhouettes capture enough information to describe people in the scene. It is this abstraction of C(x,y) that the detection technique in the illustrative embodiment seeks to obtain in order to describe moving persons in a cluttered indoor scene. The description should generally include the number of people detected, the image coordinates of each person, and the motion silhouette of each person.

If C(x,y) were given, the extraction of motion silhouettes would be straightforward. For each object, the silhouette is defined by points closest to the bounding box of the object. However, we do not have access to C(x,y). Instead, we observe that the silhouettes are reasonably preserved in the difference image $I_t$(x,y), which arguably is a degraded version of C(x,y). We can therefore extract the motion silhouettes from $I_t$(x,y) directly. As the intensity values of $I_t$(x,y) depend mostly on local contrast, they are not relevant to motion detection. We can therefore apply a thresholding technique which takes into account sensor noise to produce a degraded version of C(x,y). An example of a thresholding technique suitable for use with the present invention can be found in P. L. Rosin, "Thresholding for Change Detection," Proc. ICCV, January 1998, pp. 274–279.

The segmentation approach used in the illustrative embodiment of the present invention makes use of a grouping principle for pre-attentive perception. This principle is similar to the "matter is cohesive" principle, described in D. Marr, "Vision: A Computational Investigation into the Human Representation and Processing of Visual Information," W.H. Freeman and Co., San Francisco, 1982, which is commonly interpreted as a smoothness or continuity constraint.

This constraint has been used by various techniques that produce a non-parametric description for the segmentation and grouping of curves and/or regions from noisy data set. One such technique, the above-noted tensor voting technique, uses second-order symmetric tensors for data representation and non-linear voting for data communication, and handles missing data, outliers, and discontinuities in an efficient and effective way. It requires no initialization, and the only two parameters are scale and subject threshold. As previously noted, step 26 of the FIG. 2 process utilizes tensor voting to determine saliency values for silhouette candidates.

The region segmentation step 22 of the FIG. 2 process will now be described in greater detail. In order to implement such a process effectively in real time, the invention exploits the above-noted observation that humans usually appear in upright positions in an image. As a result, segmenting the scene into regions using vertical lines as shown in FIG. 5 is sufficient for most applications. It may be necessary to apply the segmentation step more than once, e.g., if a scene is under-segmented such that a given region contains more than one silhouette.

As previously noted, the region segmentation step 22 segments the scene into regions by analyzing the horizontal projection profile HP(x) of the m×n binarized difference image $\bar{I}_t$(x, y), where:

$$HP(x) = \sum_{j=1}^{n} \bar{I}_t(x, j)$$

The task here essentially is to locate where discontinuities occur. Based on an approach described in M-S. Lee and G. Medioni, "Grouping ., -, ->, O-, into Regions, Curves, and Junctions," Computer Vision and Image Understanding, vol. 76, No. 1, October 1999, pp. 54–69, the region boundary saliency RS(x) is defined as:

$$R\dot{S}(x) = \sum_{i=1}^{x-1} w(x-i)HP(i) - \sum_{i=x+1}^{m} w(i-x)HP(i)$$

where $$w(x) = e^{-\frac{x^2}{\sigma^2}}$$

is the Gaussian decay function. A value of $\sigma=10$ is used in the examples shown herein, but other values could also be used. RS(x) measures the horizontal difference of data density in the local neighborhood. The maxima in |RS(x)|, which correspond to locations where maximal change in data density occur, are candidates for region boundaries. The labels of the identified region boundaries are given by the sign of the corresponding RS values, where negative RS indicates a left boundary and positive RS indicates a right boundary. The ordering of the boundary labels, and the actual differences in HP, are used to eliminate false region boundaries in the candidate set.

Figure 6:
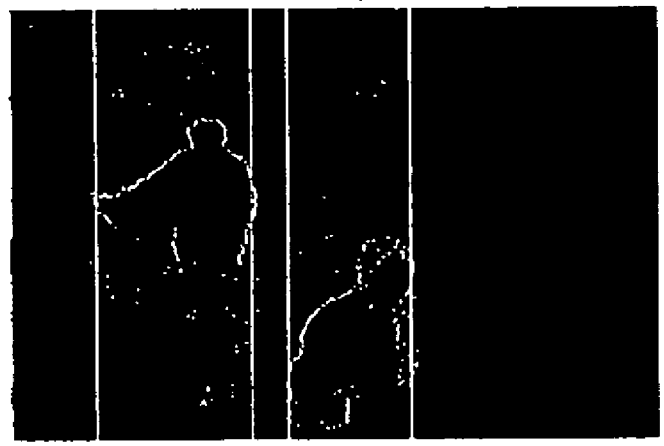
FIGS. 6 and 7 show silhouette candidates and corresponding saliency values, respectively, as computed for the segmented difference image of FIG. 5.

Once the scene is segmented into regions, points closest to the region bounding boxes are identified as candidates on the silhouettes, as noted in step 24 of FIG. 2. FIG. 6 shows the silhouette candidates. Note that the bottom part of a given silhouette is not useful and therefore is not extracted.

Figure 7:

In order to eliminate outliers and to deal with noise, the saliency of each candidate point is assessed by analyzing the silhouette configuration in the local neighborhood using a tensor voting technique, as indicated in step 26 of FIG. 2. A tensor voting technique suitable for use with the present invention is described in M-S. Lee and G. Medioni, "Grouping ., -, ->, O-, into Regions, Curves, and Junctions," Computer Vision and Image Understanding, Vol. 76, No. 1, October 1999, pp. 54–69. For the $i^{th}$ candidate point $(p_i, q_i)$, the saliency tensor $S(p_i, q_i)$ is computed as:

$$S(p_i, q_i) = \begin{bmatrix} \sum u_{ij}^2 & \sum u_{ij}v_{ij} \\ \sum u_{ij}v_{ij} & \sum v_{ij}^2 \end{bmatrix}$$

where:

$$u_{ij} = u(i,j) = w(d(i,j))\frac{(p_j - p_i)}{d(i,j)}$$

$$v_{ij} = v(i,j) = w(d(i,j))\frac{(q_j - q_i)}{d(i,j)}$$

d(i,j) is the distance between the $i^{th}$ candidate and the $j^{th}$ candidate, and w(x) is the Gaussian decay function. Since w(x) has a limited extend, with $\sigma=6$ in the current system, the computation of S can be efficiently implemented by convolution with tensors. The saliency tensor $S(p_i,q_i)$ is then decomposed into its eigenvalues $\lambda_{max}$, $\lambda_{min}$, and eigenvectors $e_{max}$, $e_{min}$. The saliency of the $i^{th}$ candidate as a silhouette point is defined to be $\lambda_{max}-\lambda_{min}$, with tangent estimated to be $e_{max}$. FIG. 7 depicts the saliency values so computed for the silhouette candidate points of FIG. 6.

In applications in which complete silhouettes are desirable, one can infer missing data and group points on the same silhouette together. This can be achieved by applying tensor voting to every point in the image to assess its saliency as a silhouette point. For a point $(x_i, y_i)$, the saliency tensor $S(x_i, y_i)$ is defined to be:

$$S(x_i, y_i) = \begin{bmatrix} \sum u'^2_{ij} & \sum u'_{ij}v'_{ij} \\ \sum u'_{ij}v'_{ij} & \sum v'^2_{ij} \end{bmatrix}$$

where $[u'_{ij} \; v'_{ij}]$ is a vector vote generated by the $j^{th}$ candidate point for the point $(x_i,y_i)$. One can use a vote generation function that is independent of the location and the orientation of the voting candidate, such that a voting kernel, with $\sigma=10$, as described in G. Guy and G. Medioni, "Inferring Global Perceptual Contours from Local Features", IJCV, Vol. 20, No. 1/2, 1996, pp. 113–133. To generate votes, the voting kernel is aligned with the tangent inferred for the voting candidate, and centered at the corresponding location. Each vote contribution is further weighted by the saliency of the voting candidate. Additional details regarding the tensor voting process can be found in the above-cited M-S. Lee and G. Medioni reference.

Figure 8:
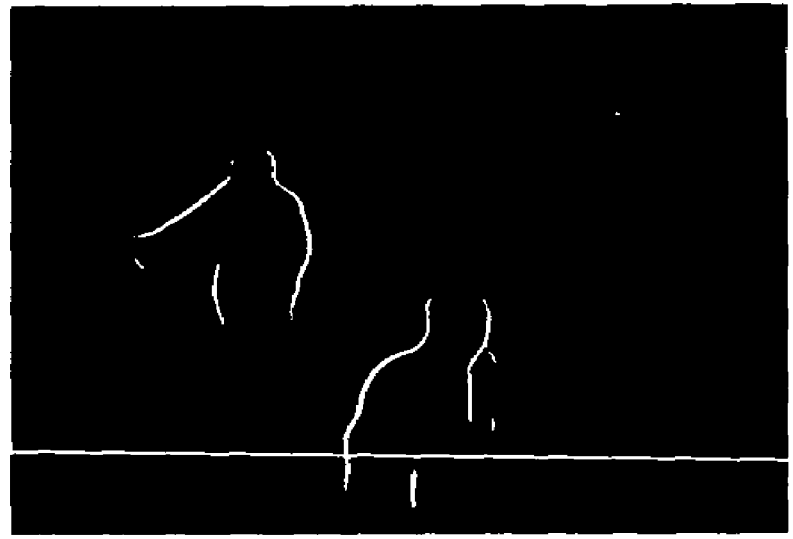
FIG. 8 shows silhouettes extracted from the silhouette candidates of FIG. 6.

After all the candidates have cast their votes, the saliency tensor so obtained is decomposed into its eigensystem and the saliency of the point is determined to be $\lambda_{max}-\lambda_{min}$. FIG. 8 shows a dense saliency map computed for the saliency values of FIG. 7. Salient silhouettes can be extracted from the saliency map of FIG. 8 by locating maximal curves using a marching procedure such as that described in C-K Tang and G. Medioni, "Inference of Integrated Surface, Curve, and Junction Descriptions From Sparse 3D Data", IEEE Trans. PAMI, vol. 20, no. 11, 1998, pp. 1206–1223.

Figure 9:
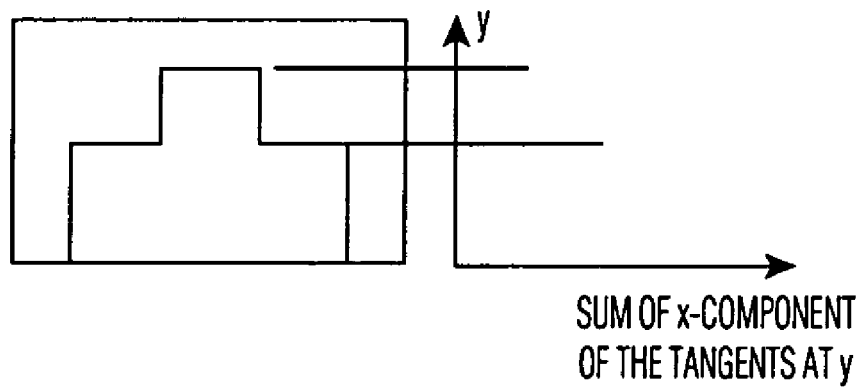
FIG. 9 illustrates a head and shoulder silhouette analysis model that may be applied to the extracted silhouettes of FIG. 8.

In the illustrative embodiment, the saliency and orientation information computed for the silhouette candidates is used to determine the head position and head size of the corresponding moving person. The change in orientation along a head and shoulder silhouette is most drastic near where the neck is located. This can be illustrated by the simplified head and shoulder model shown in FIG. 9.

The x-components of the tangents along a given silhouette form two discontinuous clusters, one at the top of the head, and one at the neck position. This is similar to the above-described maximal detection for region segmentation, and can be solved using similar techniques. The neck position is detected first, as indicated in step 28 of FIG. 2. Once the neck position is detected, candidate points above the neck are used to determine the head position and size, as indicated in step 30 of FIG. 2.

Figure 10:
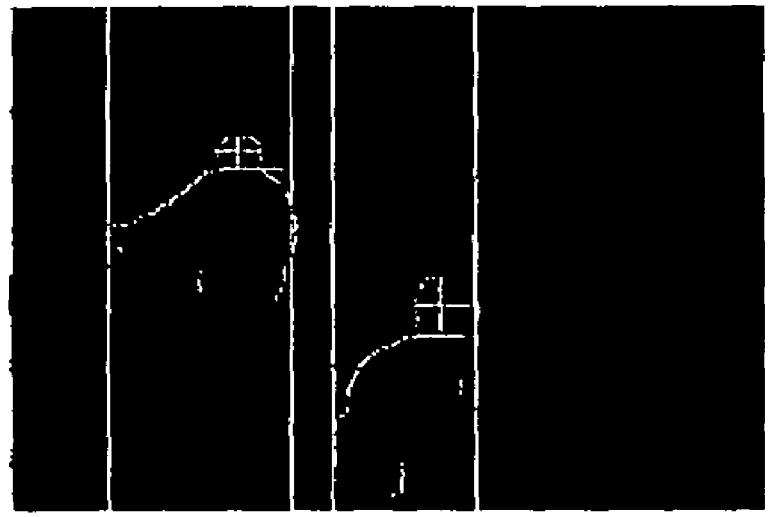
FIG. 10 shows detected neck and head positions for the FIG. 4 difference image.

FIG. 10 shows the detected neck positions, head positions and head sizes for the moving persons in the original example scene of FIGS. 3A and 3B. Notice that by analyzing the shape of the silhouette, one can eliminate non-human shape silhouettes, such as those of a chair, desk, computer, etc. Once a moving person or other object is detected, conventional tracking techniques can then be used to track further movement of the object. Such techniques are well known in the art and therefore are not described in detail herein.

The above-described detection techniques of the present invention provide a number of significant advantages over conventional techniques. For example, the techniques of the invention can detect moving persons and other objects of interest in real time, and can handle the presence of multiple persons, and varying body sizes and poses. The number of moving objects, together with positions and silhouettes of the objects, can be computed automatically without any initialization. The only parameters used in the illustrative embodiment are scale, which determines the size of a neighborhood being used to establish saliency of data, and subjective threshold, which defines the minimum saliency of "significant" motion.

The present invention thus provides a real-time image processing system that can detect moving persons or other objects of interest in cluttered indoor environments. Moreover, the extracted motion silhouettes provide useful shape information that when combined with other image cues, such as color, edges, and intensity, can be used to robustly track objects in a typical home or office scene, or other cluttered environment.

The above-described embodiments of the invention are intended to be illustrative only. For example, the invention can be used to implement real-time detection and tracking of any desired object of interest, and in a wide variety of applications, including video conferencing systems, video surveillance systems, and other camera-based systems. The invention can also be implemented at least in part in the form of one or more software programs which are stored on an electronic, magnetic or optical storage medium and executed by a processing device, e.g., by the processor 12 of system 10. These and numerous other embodiments within the scope of the following claims will be apparent to those skilled in the art.

What is claimed is:

1. A method for detecting an object of interest in an image processing system, the method comprising:
    generating a difference image;
    segmenting the difference image into a plurality of regions utilizing a grouping principle for attentive perception, wherein the difference image is segmented into a plurality of regions such that each of the regions are bounded by one or more lines passing through the entire image;
    identifying one or more silhouette candidates in at least a subset of the regions; and
    detecting the object of interest based at least in part on the identified silhouettes.

2. The method of claim 1 wherein the object of interest comprises a moving person.

3. The method of claim 2 further including the step of detecting a neck position of the moving person by analyzing a sum of x-components of tangents along a corresponding silhouette.

4. The method of claim 3 further including the step of utilizing the detected neck position to determine at least one of a head position and a head size for the moving person.

5. The method of claim 1 wherein the difference image comprises a thresholded difference image generated by taking a difference between a first image and a second image and applying binary thresholding to the resulting difference.

6. The method of claim 1 wherein the difference image is segmented into a plurality of regions such that each of the regions are bounded by one or more vertical lines passing through the entire image.

7. The method of claim 1 wherein each of the regions of the image which includes a silhouette candidate includes only a single silhouette candidate.

8. The method of claim 1 further including the step of determining saliency values for each of the silhouette candidates using tensor voting.

9. An apparatus for detecting an object of interest in an image processing system, the apparatus comprising:
    a camera; and
    a processor coupled to the camera and operative (i) to generate a difference image from a signal received from the camera; (ii) to segment the difference image into a plurality of regions utilizing a grouping principle for attentive perception, wherein the difference image is segmented into a plurality of regions such that each of the regions are bounded by one or more lines passing through the entire image; (iii) to identify one or more silhouette candidates in at least a subset of the regions; and (iv) to detect the object of interest based at least in part on the identified silhouettes.

10. The apparatus of claim 9 wherein the object of interest comprises a moving person.

11. The apparatus of claim 10 wherein the processor is further operative to detect a neck position of the moving person by analyzing a sum of x-components of tangents along a corresponding silhouette.

12. The apparatus of claim 11 wherein the processor is further operative to utilize the detected neck position to determine at least one of a head position and a head size for the moving person.

13. The apparatus of claim 9 wherein the difference image comprises a thresholded difference image generated by taking a difference between a first image and a second image and applying binary thresholding to the resulting difference.

14. The apparatus of claim 9 wherein the difference image is segmented into a plurality of regions such that each of the regions are bounded by one or more vertical lines passing through the entire image.

15. The apparatus of claim 9 wherein each of the regions of the image which includes a silhouette candidate includes only a single silhouette candidate.

16. The apparatus of claim 9 wherein the processor is further operative to determine saliency values for each of the silhouette candidates using tensor voting.

17. The apparatus of claim 9 wherein the image processing system comprises a video conferencing system.

18. The apparatus of claim 9 wherein the image processing system comprises a video surveillance system.

19. The apparatus of claim 9 wherein the image processing system comprises a human-machine interface.

20. An article of manufacture comprising a storage medium for storing one or more programs for detecting an object of interest in an image processing system wherein the one or more programs when executed by a processor implement the steps of:
    generating a difference image;
    segmenting the difference image into a plurality of regions utilizing a grouping principle for attentive perception, wherein the difference image is segmented into a plurality of regions such that each of the regions are bounded by one or more vertical lines passing through the entire image;
    identifying one or more silhouette candidates in at least a subset of the regions; and
    detecting the object of interest based at least in part on the identified silhouettes.

* * * * *